United States Patent [19]
Daniel et al.

[11] 3,849,104
[45] Nov. 19, 1974

[54] CONTROL OF AESCHYNOMENE SP. WITH COLLETROTRICHUM GLOEOSPORIOIDES PENZ. F. SP. AESCHYNOMENE

[75] Inventors: James T. Daniel; George E. Templeton, both of Fayetteville; Roy J. Smith, Jr., Stuttgart, all of Ark.

[73] Assignee: The United States of America as represented by the Secretary of Agriculture, Washington, D.C.

[22] Filed: Apr. 17, 1973

[21] Appl. No.: 351,934

[52] U.S. Cl. .......... 71/65, 71/79
[51] Int. Cl. .......... A01n 9/00
[58] Field of Search .......... 424/93; 71/79, 65

[56] References Cited

OTHER PUBLICATIONS

Tandon et al., "Physiological Studies on C. Gloesporioides, etc.," (1962), CA 58, p. 2674, (1963).

*Primary Examiner*—Glennon H. Hollrah
*Attorney, Agent, or Firm*—M. Howard Silverstein; Max D. Hensley

[57] ABSTRACT

This invention relates to a method for controlling northern jointvetch. More particularly, this invention relates to a method for controlling northern jointvetch with an endemic anthracnose disease of northern jointvetch [Aeschynomene virginica (1) B.S.P.] incited by the fungus *Colletotrichum gloesporioides* Penz. form specialis *aeschynomene*, American Type Culture Number 20358.

1 Claim, No Drawings

CONTROL OF AESCHYNOMENE SP. WITH COLLETROTRICHUM GLOEOSPORIOIDES PENZ. F. SP. AESCHYNOMENE

A non-exclusive, irrevocable, royalty-free license in the invention herein described, throughout the world for all purposes of the United States Government, with the power to grant sublicenses for such purposes, is hereby granted to the Government of the United States of America.

Since many pesticides persist in the environment, non-chemical methods of pest control might be excellent alternatives to chemical pesticides. The use of plant diseases to control weeds is a concept that has intrigued laymen and scientists alike for many years; yet, there have been few deliberate attempts to use plant pathogens for biological control of weeds. No attempts with diseases have been so dramatically effective as those with introduced insects on pastures and range weeds. Very likely, the reluctance of pathologists to work with introduced pathogens has been reinforced by the knowledge of devastation suffered by perennial host upon accidental introduction of the chestnut blight, dutch elm, and white pine blister rust organisms. Knowledge of the wide diversity among pathogens as to host specificity and inherent variability has also been a deterrent.

The use of endemic pathogens for biological control of weeds has received little attention, but probably holds the greatest promise for use on annual weeds in cultivated crops as either a substitute for, or an adjunct to, chemical herbicides. The endemic pathogen presumably evolved with its host and of necessity must not be totally destructive in the native habitat or the pathogen too would disappear. This has led some to conclude that the endemic pathogens are relatively poor prospects for biological control agents. This is probably a valid conclusion if one restricts the definition of biological control to cover only the initiation of epiphytotics on weeds in permanent pastures or other uncultivated areas. On the other hand, if one consideres biological control in a broader sense, i.e., the use of a biological agent (biological herbicide) as one would use a chemical herbicide, endemic pathogens might be completely destructive to its weed host by timing the application to take advantage of a particularly susceptible stage of growth with ample inoculum. This would avoid the requirement of a lag period for inoculum buildup and distribution essential in initiated or natural epiphytotics, and make it possible to take advantage of any natural or artificial conditions which would provide a lengthened period or increased degree of susceptibility for disease development.

We initiated these investigations (a) to determine the efficacy of Colletotrichum gloeosporioides f. sp. aeschynomene, ATCC 20358, for control of northern jointvetch in rice, (b) to establish the host range of the fungus, (c) to develop methods of producing spores in mass quantities, and (d) to ascertain information on the etiology of the disease.

Northern jointvetch is a troublesome leguminous weed in Eastern Arkansas in rice fields, canals, and waste areas, on field levees and ditch banks, and to a lesser extent, in soybean fields. It reduces both yield and quality of rice. Populations as low as 2.7 plants per $m^2$ reduced rice yields singificantly when competition lasted all season. Competition was most evident when the weed began to shade the rice at 8 to 10 weeks after emergence of rice. The grade of harvested rice is reduced if it contains northern jointvetch seed since they are very difficult to remove in milling and are intolerable in packaged rice. The weed is presently being controlled in rice by phenoxy herbicides, chiefly (2,4,5-trichlorophenoxy)acetic acid (2,4,5-T) at 0.8 to 1.7 kg/ha. The herbicides 2-(2,4,5-trichlorophenoxy)-propionic acid (silvex) and (2,4-dichlorophenoxy)acetic acid (2,4-D) are also used but are somewhat less effective than 2,4,5-T. If not applied at the proper time, these herbicides may reduce rice yields by injuring the plants or by increasing the susceptibility of rice to brown leaf spot (Heminthosporium oryzae B. de Hann). Small spray droplets of phenoxy herbicides frequently drift from the target rice fields and damage nearby susceptible crops, especially cotton and soybeans.

The disease was first noted in 1969 at the University of Arkansas Rice Branch Exp. Sta. while conducting competition experiments in rice interplanted with northern jointvetch plants. It virtually eradicated these weeds the seed of which had been collected from southern Arkansas County. Distribution of the disease on northern jointvetch was determined by surveying rice fields, canals, and drainage ditches in rice-growing areas of Arkansas during 1970 and 1971 near the time weeds matured. Diseased weed plants were found in many rice-growing areas of Arkansas.

The organism produces typical antracnose lesions with abundant sporulation from pustules (acervuli) scattered throughout the lesion. On mature plants these lesions range in size from 0.9 to 3.5 cm in length, sometimes coalesce, and frequently develop at the leaf axil. They may be scattered on individual plants throughout a weed colony or may occur only on an individual plant in the colony. In either case the disease appears to be of minor consequence to the infected plants and does not reduce vigor or seed production appreciably in its natural habitat.

The acervuli are glabrous (non-setose) and are slightly sunken in the host tissue. In moist conditions, light orange slimy masses of spores accumulate on the upper surface of the acervulus breaking the epidermal layer and cuticle. Spores (conidia) are elliptical with rounded ends, range in size from 14 to 17 by 4 to $5.7\mu$ and average 15.8 by $5.5\mu$. These characteristics plus its highly specialized parasitizing of species in the host genus Aeschynomene place it in the Fungi Imperfecti order Melanconiales, as a new form of Collectotrichum gloeosporioides Penz. and designated as C. gloeosporioides form specialis aeschynomene.

Liquid media were preferrable for mass production of spores for greenhouse or field inoculations. Continuous aeration by vigorous shaking was necessary for maximum yields in these media. Highest spore yields were obtained in 5 days with modified Richard's solution, 50 ml per 250 ml Erlenmeyer flask, on a rotary shaker (110 RPM) at 30°C. The modified Richard's solution contained 50 g of commercial sucrose, 10 g of $KNO_3$, 5 g of $KH_2PO_4$, 2.5 g of $MgSO_4 \cdot 7H_2O$, 0.02 g of $FeCl_3$, 150 ml of V-8 juice and distilled water to make 1 L; the solution was adjusted to pH 6 with 50% NaOH.

For large scale field inoculations spores were produced in 3-L Erlenmeyer flasks containing 1.5 L medium and aerated by continuous stirring with a magnetic stirrer during a 5-day period of growth. Spores were harvested by filtration through two layers of cheese cloth, centrifugation of the filtrate at 3,000 RPM for 10 min, resuspension of the pellet in distilled water and a second centrifugation. Wet spores in the refrigerator could be stored for 2 to 4 days. Preliminary experiments with freeze drying indicate that spores can be stored in this manner without appreciable loss of germination. The harvesting, short term storage, and dilutions of spores were done with standard laboratory procedures without strict maintenance of aseptic conditions.

Estimates of spore concentration were made colorimetrically at 525 m$\mu$. A standard curve was established by diluting spore suspension to give three transmittance levels between 20 and 80 percent and then determining spore concentrations at these levels by counts. Spore counts were made on diluted aliquots of each suspension with the aid of a hemacytometer at 125X.

The following examples illustrate but do not limit the scope of this invention.

EXAMPLE 1

Greenhouse Experiments

The disease developed on northern jointvetch grown in the greenhouse at temperatures ranging from 23° to 32° C by inoculation of plants at any age from two week old seedlings up to mature plants. Northern jointvetch plants ranging from 5.1 to 30.5 cm tall were diseased and killed by the organism (Table I). Plants not killed were stunted by the disease. Although the fungus infected and stunted Indian jointvetch plants, it failed to kill any of them. Spraying plants with spore suspension ranging in concentration from 2 to 15 million spores per ml and using enough volume to obtain runoff was the most efficient means of inoculation. Symptons developed most rapidly if inoculated northern jointvetch plants were incubated in a moist chamber (relative humidities above 80 percent) during the night immediately following inoculation; however, plants held as long as 10 days in the greenhouse without further supplemental moisture also became diseased and eventually died. About 5 days were required between inoculation and development of sysmptoms, including acervulus production, under ideal conditions in the greenhouse. The first evidence of the disease was a water-soaked spot in stem and leaf tissues that progressed to characteristic anthracnose lesions which eventually coalesced and frequently affected the entire stem.

The host specificity of the fungus was determined in the greenhouse by spraying spore suspension on various crop and weed seedlings and with northern jointvetch included in each series of plants as a check on inoculation efficacy. It did not infect the plants grown in the greenhouse listed in Table II. It did infect Indian jointvetch grown in the greenhouse and field but was less virulent on it than on northern jointvetch (Table I).

EXAMPLE 2

Field Experiments

The efficacy of the fungus for controlling northern jointvetch in replicated field experiments was tested in 1970 through 1972 at the Rice Branch Exp. Sta. No differences in control could be detected between inoculum levels of 2, 4, or 6 million spores per ml when sprayed at dusk at 374 L/ha. Control was most rapid when weeds were younger but control averaged 99 percent when weeds were as tall as 66 cm (Table III). Control was characteristically slower than control by 2,4,5-T since the incubation period was from 4 to 7 days in the field. Up to 5 weeks were usually required before the organism killed the weeds; 2,4,5-I usually kills the weed within 2 weeks after treatment. Weeds, other than northern jointvetch, and crops were not affected by the disease (Table II).

In 1970 secondary spread of the organisms between plots in a randomized complete block experiment negated any possibility of attributing effectiveness to either inoculum levels or age of plants. The test was redesigned for the 1971 and 1972 seasons to include a buffer strip of rice and levee on each side of the treated plots. This confined secondary spread of the fugus and permitted valid comparisons between treated and untreated plots.

Northern jointvetch was controlled during 1972 in a three-acre field of 'Nato' rice by aerial application of *C. gloeosporioides* f. sp. *aeschynomene* conidia at a concentration of 2 million spores per ml sprayed at dust at 94 L/ha. Weeds were 30 to 45 cm tall and disease was evidenced 7 days after treatment. In an untreated area located about 250 m from the treated field, northern jointvetch plants exhibited no symptoms of the disease. In the treated field the disease killed 99 percent (4,430 of 4,490 were killed) of the weed plants 46 days after Table 1

Response of Indian and northern jointvetch to spore sprays of *Colletotrichum gloeosporioides* f. sp. *aeschynomene* in a greenhouse experiment, Stuttgart, 1971[a]

| Plant height at treatment | No spores applied | Indian jointvetch | | | Northern jointvetch | | |
| --- | --- | --- | --- | --- | --- | --- | --- |
| | | Necrotic area on living stems | Dead plants | Green weight reduction[b] | Necrotic area on living stems | Dead plants | Green weight reduction[b] |
| cm | million | no | % | % | no | % | % |
| 5.0 | 0 | 0 | 0 | 0 | 0 | 0 | 0 |
| 5.0 | 45 | 0 | 0 | 53 | — | 100 | 100 |
| 5.0 | 90 | 0 | 0 | 9 | — | 100 | 100 |
| 10.2 | 0 | 0 | 0 | 0 | 0 | 0 | 0 |
| 10.2 | 45 | 0 | 0 | 0 | 3 | 75 | 80 |
| 10.2 | 90 | 0 | 0 | 0 | 6 | 50 | 87 |
| 20.3 | 0 | 0 | 0 | 0 | 0 | 0 | 0 |
| 20.3 | 45 | 2 | 0 | 21 | 13 | 32 | 64 |
| 20.3 | 90 | 2 | 0 | 4 | 5 | 58 | 78 |
| 30.5 | 0 | 0 | 0 | 0 | 0 | 0 | 0 |
| 30.5 | 45 | 6 | 0 | 36 | 11 | 82 | 93 |
| 30.5 | 90 | 17 | 0 | 34 | 23 | 68 | 92 |

[a] Weeds were thinned to 4 plants per 3.3-L metal pot before applying 15 min of spore suspension. For 24 hr after spraying, weeds were placed in a dark chamber maintained at 29 C and 85% relative humidity; they were then returned to the greenhouse with a 16-hr photoperiod, a temperature of 30 C and a relative humidity of 40% during the day, and a temperature of 23 C and a relative humidity of 70% during the night. All determinations were made 21 days after each time of treatment.

[b] Reduction of weight of living treated plants compared with that of living untreated plants.

treatment. The infection progressed with time since 47 and 84% of the plants were dead 16 and 33 days after treatment, respectively. Plants not killed were severely diseased and stunted. They did not compete with rice and produced few if any seed. The fungus did not develop on soybeans adjacent to the rice field.

We claim:
1. A process for controlling northern jointvetch weeds comprising inoculating the weed with an amount of the fungus *Colletotrichum gloeosporioides* f. sp. *aeschynomene* sufficient to infect and kill the weed.

* * * * *

Table II

Plant species tolerant to inoculations of
*Colletotrichum gloeosporioides* f. sp. *aeschynomene*
in greenhouse and field experiments, Fayetteville
and Stuttgart, 1970 to 1972.

| Common Name | Scientific Name |
| --- | --- |
| | Greenhouse |
| alfalfa | *Medicago sativa*, L |
| cotton | *Gossypium hirsutum* L. |
| cowpea | *Vigna unquiculata* (L.) Walp. |
| cucumber | *Cucumis sativus* L. |
| grain sorghum | *Sorghum bicolor* (L.) Moench. |
| green bean | *Phaseolus vulgaris* L. |
| hemp sesbania | *Sesbania exaltata* (Raf.) Cory. |
| jack bean | *Canavalia ensiformis* (L.) DC. |
| lespedeza | *Lespedeza stipulacea* Maxim. |
| lima bean | *Phaseolus lunatus* L. |
| okra | *Hibiscus esculentus* L. |
| rice | *Oryza sativa* L. |
| soybean | *Glycine max* (L.) Merr. |
| tomato | *Lycopersicon esculentum* Mill. |
| white clover | *Trifolium repens* L. |
| white lupine | *Lupinus albus* L. |
| | Field |
| arrowhead | *Sagittaria* sp |
| barnyardgrass | *Enchinochloa crus-galli* (L.) Beauv. |
| blunt spikerush | *Eleocharis obtusa* (willd.) Schultes |
| broadleaf signalgrass | *Brachiaria platyphylla* (Griseb.) Nash |
| ducksalad | *Heteranthera limosa* (Sw.) Willd. |
| eclipta | *Eclipta alba* (L.) Hassk. |
| false nutsedge | *Cyperus strigosus* L. |
| gooseweed | *Sphenoclea zeylanica* Gaertn. |
| hemp sesbania | *Sesbania exaltata* (Raf.) Cory. |
| purple ammannia | *Ammannia coccinea* Rothb. |
| red stem | *Ammannia auriculate* Willd. |
| rice | *Oryza sativa* L. |
| rice flatsedge | *Cyperus iria* L. |
| soybean | *Glycine max* (L.) Merr. |
| sprangletop | *Leptochloa panicoides* (Presl.) Hitchc. |
| waterhyssop | *Bacopa rotundifolia* (Michx.) Wettst. |
| winged waterprimrose | *Jussiaea decurrens* (Walt.) DC. |

Table III

Response of northern jointvetch to spore sprays of
*Colletotrichum gloeosporiodides* f. sp. *aeschnyomene*
in the field, Stuttgart, 1971[a]

| Height of weed at treatment | Weed stand[b] | | Oven-dried weed plants[c] | |
| --- | --- | --- | --- | --- |
| | Plants/m$^2$ | Reduction | Weight | Reduction |
| | No | % | g/m$^2$ | % |
| untreated check | 5.08 | — | 160.0 | — |
| 36 | .03 | 99 | 1.2 | 99 |
| 66 | .10 | 98 | 1.0 | 99 |

[a] Spore suspensions applied at 2 to 6 million per ml in 300 L/ha of water spray.
[b] Stands determined 40 and 27 days after the 36 and 66 cm height treatments, respectively.
[c] Weeds harvested 53 and 40 days after the 36 and 66 cm height treatments, respectively. Weeds were dried in the greenhouse for several weeks and then placed in a forced-air oven at 70 C for 24 hr just before weighing.